United States Patent
Li et al.

(10) Patent No.: US 11,497,059 B2
(45) Date of Patent: *Nov. 8, 2022

(54) METHOD AND APPARATUS FOR TRANSMITTING DATA

(71) Applicant: Samsung Electronics Co., Ltd., Suwon-si (KR)

(72) Inventors: Yingyang Li, Beijing (CN); Shichang Zhang, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,599

(22) Filed: Jun. 7, 2021

(65) Prior Publication Data

US 2021/0297995 A1 Sep. 23, 2021

Related U.S. Application Data

(63) Continuation of application No. 16/320,824, filed as application No. PCT/KR2017/007910 on Jul. 21, 2017, now Pat. No. 11,032,849.

(30) Foreign Application Priority Data

Jul. 26, 2016 (CN) .......................... 201610597275.7
Aug. 10, 2016 (CN) .......................... 201610652706.5
(Continued)

(51) Int. Cl.
H04W 74/08 (2009.01)
H04W 28/26 (2009.01)
(Continued)

(52) U.S. Cl.
CPC ...... *H04W 74/0816* (2013.01); *H04B 17/318* (2015.01); *H04W 28/26* (2013.01);
(Continued)

(58) Field of Classification Search
CPC ......... H04W 74/0816; H04W 74/0808; H04W 52/143; H04W 72/0473; H04W 72/1205;
(Continued)

(56) References Cited

U.S. PATENT DOCUMENTS 10,764,902 B2  9/2020  Seo
2004/0121788 A1  6/2004  Moon et al.
(Continued)

FOREIGN PATENT DOCUMENTS

WO  2014107091 A1  7/2014
WO  2015/021185 A1  2/2015
(Continued)

OTHER PUBLICATIONS

Etri, "Discussion of sensing algorithms for mode 2 resource selection", R1-143051, 3GPP TSG RAN WG1 Meeting #78, Dresden, Germany, Aug. 10, 2014.
(Continued)

*Primary Examiner* — Ricardo H Castaneyra
(74) *Attorney, Agent, or Firm* — Jefferson IP Law, LLP

(57) ABSTRACT

Embodiments of the present disclosure provide a method for transmitting data, including: sensing, by a first device, a scheduling assignment (SA) of another device; measuring a received power of the other device, and measuring a total received energy of a subframe/subband; determining a received power reference value and a total received energy reference value of the other device according to the SA; selecting resources; and transmitting data using the selected resources. According to the method of the present disclosure, the performance of the method which avoids collision (Continued)

based on SA is improved, and measurement accuracy of the total received energy of the subband is increased. Thus, resource selection/re-selection can be performed better. As such, interferences between devices can be avoided effectively.

8 Claims, 5 Drawing Sheets

(30) Foreign Application Priority Data

Aug. 12, 2016 (CN) .......................... 201610663604.3
Sep. 22, 2016 (CN) .......................... 201610843063.2

(51) Int. Cl.
*H04W 72/04* (2009.01)
*H04W 72/12* (2009.01)
*H04B 17/318* (2015.01)
*H04W 52/14* (2009.01)
*H04W 72/02* (2009.01)

(52) U.S. Cl.
CPC ..... *H04W 52/143* (2013.01); *H04W 72/0453* (2013.01); *H04W 72/0473* (2013.01); *H04W 72/1205* (2013.01); *H04W 72/1263* (2013.01); *H04W 74/0808* (2013.01); *H04W 72/02* (2013.01); *H04W 72/0446* (2013.01)

(58) Field of Classification Search
CPC ............. H04W 72/02; H04W 72/0446; H04W 72/1231; H04B 17/318
See application file for complete search history.

(56) References Cited

U.S. PATENT DOCUMENTS

| 2005/0107091 | A1 | 5/2005 | Vannithamby et al. |
| 2015/0215903 | A1 | 7/2015 | Zhao et al. |
| 2015/0334698 | A1 | 11/2015 | Park et al. |
| 2015/0334760 | A1 | 11/2015 | Sartori et al. |
| 2015/0358981 | A1 | 12/2015 | Chae et al. |

FOREIGN PATENT DOCUMENTS

| WO | 2015065632 A1 | 5/2015 |
| WO | 2016032184 A1 | 3/2016 |
| WO | 2017/196159 A2 | 11/2017 |

OTHER PUBLICATIONS

3GPP TSG RAN WG1 #86. Samsung. R1-166714, Details on Sensing Based Resource Selection. Gothenburg, Sweden Aug. 22-26, 2016.
3GPP TSG RAN WG1 Meeting #85. Samsung. R1-164757, Sensing Procedure for UE Autonomous Resource Selection. Nanjing, May 23-27, 2016.
3GPP TSG RAN WG1 Meeting #84bis. Sony. R1-162560, Discussion on Sensing for Autonomous Resource Selection. Busan, Korea, Apr. 11-15, 2016.
European Office Action dated Jan. 21, 2021, issued in European Application No. 17 834 709.2-1215.
Lenovo, "Mechanisms for V2V resource allocation", 3GPP TSG RAN WG1 Meeting #84, R1-161014, St. Julian's, Malta,XP051054318, Feb. 15-19, 2016.
European Search Report dated Jun. 27, 2019, issued in European Patent Application No. 17834709.2.

METHOD AND APPARATUS FOR TRANSMITTING DATA

CROSS-REFERENCE TO RELATED APPLICATION(S)

This application is a continuation application of prior application Ser. No. 16/320,824, filed on Jan. 25, 2019, which has issued as U.S. Pat. No. 11,032,849 on Jun. 8, 2021, which was a U.S. National Stage application under 35 U.S.C. § 371 of an International application number PCT/KR2017/007910, filed on Jul. 21, 2017, which is based on and claimed priority of a Chinese patent application numbers 201610597275.7, filed on Jul. 26, 2016, 201610652706.5, filed on Aug. 10, 2016, 201610663604.3, filed on Aug. 12, 2016, and 201610843063.2, filed on Sep. 22, 2016, in the State Intellectual Property Office of the People's Republic of China, the disclosures of which are incorporated herein by reference in its entirety.

BACKGROUND

1. Field

The present invention relates to wireless communications technologies, more particularly to a method and an apparatus for selecting or re-selecting resources to transmit data in a V2X system.

2. Description of Related Art

At present, Device To Device (D2D) communications technique has been accepted by 3GPP standards due to its huge potential benefits in public security field and common civil communications field, and standardization of some functions has been finished in 3GPP Rel-12 and Rel-13, including: D2D discovery for an in-coverage scenario, D2D broadcast communication for an In-Coverage (IC) scenario, a Partial Coverage (PC) scenario and an Out-of-Coverage (OC) scenario.

At present, 3GPP Rel-12 has defined two D2D broadcast communication modes, respectively Mode 1 and Mode 2. Mode 1 requires that a broadcasting UE of the D2D communication shall be an In-Coverage UE (ICUE). The UE obtains configuration information of a Physical Sidelink Control Channel (PSCCH) resource pool of Mode 1 through receiving system broadcast signaling transmitted by eNB, including PSCCH periodicity and positions of subframes for transmitting PSCCH in each period, and positions of Physical Resource Blocks (PRBs) for transmitting the PSCCH in each subframe. If the UE supporting the Mode 1 broadcast communication has a data transmission requirement, the UE applies for dedicated Mode 1 communication resources from the eNB via a specific Buffer Status Report (BSR); then, the UE detects sidelink grant of the eNB before each PSCCH period, and obtains the positions of the resources transmitting the PSCCH and the Physical Sidelink Shared Channel (PSSCH) in the PSCCH period. In Mode 1, resource conflict between different UEs may be avoided via centralized control of the eNB.

The broadcasting UE of a D2D communication in Mode 2 may be an ICUE, or may be an Out-of-Coverage UE (OCUE). The ICUE obtains the PSCCH resource pool and associated PSSCH resource pool configuration of Mode 2 through receiving eNB system broadcast signaling, wherein the PSSCH resource pool includes positions of subframes used for transmitting the PSSCH in an associated PSCCH period and the positions of the PRBs used for transmitting the PSSCH in each subframe. In each PSCCH, resources for transmitting the PSCCH and the associated PSSCH are selected randomly. The OCUE determines the PSCCH resource pool and the associated PSSCH resource pool configuration according to pre-configured information. The resource selection manner is similar to that of the ICUE. In a PC scenario, the Mode 2 resource pool configuration pre-configured by the OCUE is relevant to the carrier-frequency, system bandwidth and/or TDD configuration of a cell where the ICUE participating in the D2D broadcast communication belongs to.

In the above two D2D broadcast communication modes, the PSCCH resource pool and the PSSCH resource pool or the PSSCH resource are bound one by one. In each PSCCH period, the position of the PSCCH resource pool is ahead of the associated PSSCH resource pool or PSCCH resource, and the resources of them do not overlap. In addition, all D2D terminals operate in half-duplex mode, which results in that terminals transmitting signals simultaneously cannot receive the signals of the other side. In Rel-12, in each PSCCH period, each PSCCH is transmitted for two times, each time of PSCCH transmission occupies one PRB, and the above half-duplex problem is solved via resource hopping. For example, for the PSCCHs which are transmitted in the same subframe at the first time, an offset is generated for the positions of the subframes for the second time transmission. The offset is relevant to the frequency position of the transmission resource of the first time, so as to ensure that the positions of the subframes used for retransmission of the PSCCHs which are transmitted in the same subframe in the first time are different. In addition, the two times of transmission also ensures receiving reliability of the PSCCH.

FIG. 1 shows an uplink subframe structure of a D2D system defined by 3GPP. In the 14 OFDM symbols of a subframe, two OFDM symbols, with symbol indexes of respectively 3 and 10, are used for transmitting Demodulation Reference Signal (DMRS). The last OFDM symbol in the subframe is punctured fixedly for providing a transmitting/receiving switching time and avoiding overlap of two adjacent subframes due to reasons such as propagation delay, timing advance, etc. Other symbols are used for transmitting uplink data. Herein, the first OFDM symbol of the subframe is also used for transmitting data. In practical applications, this OFDM symbol may also be used for Automatic Gain Control (AGC).

The D2D communication proposed by 3GPP is mainly designed for low speed terminals and V2X services which are not delay sensitive and have low receiving reliable requirement. Therefore, the existing D2D capabilities are far from meeting the user's requirements. In subsequent 3GPP releases, various communications terminal vendors and communications network device vendors have reached a consensus to improve the D2D functional architecture. Based on the current D2D broadcasting communication mechanism, one of functions need to be standardized firstly is to support direct low latency and high reliability communications between high speed devices, high speed device and low speed device, and high speed device and fixed device, i.e., Vehicle To Vehicle, Pedestrian/Infrastructure/Network (V2X).

The uplink subframe structure as shown in FIG. 1 meets the most application scenario requirements of D2D. However, as to a typical V2X application scenario, e.g., V2X communication requires that a relative moving speed of up to 500 km/h of UE is supported, the carrier frequency may reach 6 GHz, the Doppler frequency shift brought out by the high moving speed and the high carrier frequency may lead to serious inter-carrier interference, in addition, considering the impact of the difference timing offset and frequency offset between the base station and the UE, the DMRS pattern as shown in FIG. 1 cannot meet performance requirement. In current discussion of 3GPP meetings, the solution as shown in FIG. 2 is an important solution, i.e. through transmitting DMRS on 4 OFDM symbols, the time density of the DMRS is increased, i.e., the indexes of the DMRS symbols are 2, 5, 8 and 11, so as to provide better performance.

In the D2D system proposed by 3GPP, the DMRS sequence of PSCCH is fixed, i.e. all transmitting ends use the same DMRS sequence. In particular, based on the DMRS generating method of LTE, a DMRS root sequence is obtained according to a Physical Cell ID (PCID) 510, and the Cyclic Shift (CS) of the DMRS is fixedly to be 0, the Orthogonal Cover Code (OCC) is [1 1]. The scramble sequence of the scheduling information carried by the PSCCH is also fixed, i.e., all of the transmitting ends use the same scramble sequence. In particular, based on the scramble generation method of LTE, PCID is configured to 510, other information such as slot index and UE identifier is configured to 0 fixedly. Base on this method, if two devices transmit SA on the same PRB, the DMRS of the two devices are overlapped completely, equivalent as one DMRS sequence at the receiving end. Since the terminal density in the V2X communication is far higher than D2D, the probability that two or more devices transmit SA and/or data on the same resource is dramatically increased, i.e. the SA resource conflict is dramatically increased. In addition, besides the conflict, even if two transmitting devices transmit data on different frequencies of the same subframe, considering the impact of near-far effect, the in-band leakage interference also seriously affect the receiving performance. In other words, for a receiving end, the energy leaked to an adjacent PRB by a near device may have similar or even higher amplitude than the signals on the adjacent PRB from a remote device. Since the terminal density in the V2X is far higher than D2D, the above in-band leakage interference may become more serious.

According to the discussion of current standardization meetings, one solution is to solve the collision and in-band leakage via sensing. Herein, a basic assumption is that devices occupy resources in a Semi-Persistent (SPS) manner, i.e., a device occupies resources periodically during a period of time. As shown in FIG. 3, suppose that a device selects the PSCCH/PSSCH resource in subframe n, the device firstly senses the resources in the resource pool in the time period from subframe n-a to subframe n-b, and determines which time-frequency resources are occupied and which time-frequency resources are idle; and then selects the PSCCH/PSSCH resource in subframe n, suppose that subframe n+c is selected for transmitting PSCCH, subframe n+d is selected for transmitting PSSCH, and resources in subframe n+e are reserved. Then, PSCCH is transmitted in subframe n+c, and PSSCH is transmitted in subframe n+d, and a next data is transmitted on reserved resources in subframe n+c. The device may sense the resources in the resource pool via two manners. One is to obtain accurate channel occupation information of other devices via decoding the PSCCH, so as to measure the received power of the corresponding devices. The other is based on measurement of the energy of the PSSCH resource pool. The former manner may obtain accurate channel occupation and reservation information. However, if the PSCCH is not correctly received, e.g. PSCCHs of several devices collides, the sensing based on PSCCH fails. The later method is to determine whether resources are occupied based on amplitude of the measured energy, so as to avoid using occupied resources as much as possible. However, since the V2X service is not strictly periodic, messages of different devices in a period of time may have different periodicities, which affect the prediction performance of the energy measurement method. Actually, the PSCCH-based sensing and the energy-based measurement may be utilized in combination to avoid collision and interference as much as possible and improve performance. In the case that PSCCH is correctly received, it is problem to be solved that how to measure the energy of the PSCCH.

Technical Solution

Embodiments of the present disclosure provide a data transmitting method, a device and a base station, and provide a method.

In view of the above, embodiments of the present disclosure provide the following solution.

According to an embodiment of the disclosure, a data transmitting method includes:

sensing, by a first device, a scheduling assignment (SA) of another device;

measuring a received power of the other device, and measuring a total received energy of a subframe/subband;

determining a received power reference value and a total received energy reference value of the other device according to the SA;

selecting resources; and transmitting data using the selected resources.

In some embodiments, the resources are selected in subframe n, if a subframe/subband after subframe n is occupied for data transmission by at least one device and if the received power reference value of the at least one device on the subframe/subband exceeds a threshold Th.

In some embodiments, a data transmitting method includes obtaining a sum of received power reference values of at least one other device; and comparing the sum of the received power reference values with a threshold Th2, wherein the resources are selected in subframe n, if the subframe/subband after subframe n is occupied for data transmission by at least one device and if the sum exceeds the threshold Th2.

In some embodiments, a data transmitting method includes dividing at least one other device into at least one group;

obtaining a sum of received power reference values of the at least one group; and comparing the sum with a threshold Th3, wherein the resources are selected in subframe n, if the subframe/subband after subframe n is occupied for data transmission by the at least one other device, if the sum exceeds the threshold Th3.

In some embodiments, the dividing is performed based on:

one or more parameters of the K devices;

or, configuring an independent threshold Th for each of the K devices.

In some embodiments, the threshold is a common value for different devices; or the threshold is determined according to one or more parameters of the first device; or the threshold is determined based on one or more parameters of the another device; or the threshold is determined according to a combination of one or more parameters of the first device and one or more parameters of the another device.

In some embodiments, if the resources are selected in subframe n, for a subframe m occupied by the first device in a sensing window, all subframes $z=mP_q$ after subframe n are unusable for the first device, wherein $P_q$ denotes a resource reservation periodicity, $q \in Q$, Q is semi-statically configured by higher layer or predefined; $R_{x,y}$ denotes a single subframe resource in a selection window, y is an index of a subframe where $R_{x,y}$ is located, x is an index of a subband where starts; if there is a value j which makes $y+j \cdot P_A=z$, $R_{x,y}$ is unusable for the first device, j is an integer larger than or equal to 0, or j is an integer larger than or equal to 0 but smaller than C, C denotes a number of periods that the first device performs resource reservation according to a periodicity $P_A$;

or, if the resources are selected in subframe n, for the subframe m occupied by the first device in the sensing window, all subframes $z=m+k \times P_0$ after subframe n are unusable for the first device, k is a positive integer or an integer larger than or equal to 1 but smaller than $\max(P_q)/P_0$; if there is a value k which makes z located in a selection window, all single subframe resources in subframe z in the selection window are unusable for the first device.

In some embodiments, the subframe m occupied by the first device in the sensing window is one of subframes where resources occupied by the first device obtained by a last time resource re-selection in the sensing window or all subframes occupied by the first device in the sensing window.

In some embodiments, the subframe m occupied by the first device in the sensing window is one of a subframe in which the SA and data are transmitted, a subframe in which data is transmitted, a subframe in which data is transmitted or subframes in which SA is transmitted in last X periods, wherein the X is a predefined constant or a value configured by higher layer signaling.

In some embodiments, if a second device occupies resource Y after subframe n, wherein the received power reference value on resource Y is $P_{RSRP}^{PSSCH}$, $R_{x,y}$ denotes a single subframe resource in a selection window, y is an index of the subframe that $R_{x,y}$ is located, and x denotes an index of the subband where $R_{x,y}$ is started, if $R_{x,y+j \cdot P_A}$ overlaps with the resource Y, obtaining $P_{RSRP}^{PSSCH,(e)}$ according to $P_{RSRP}^{PSSCH}$, if $P_{RSRP}^{PSSCH,(e)}$ exceeds the threshold, $R_{x,y}$ is unusable for the first device, j is an integer larger than or equal to 0 or an integer larger than or equal to 0 but smaller than C, C is the number of periods that the first device performs resource reservation according to periodicity $P_A$;

wherein the obtaining $P_{RSRP}^{PSSCH,(e)}$ according to $P_{RSRP}^{PSSCH}$ comprises:

$P_{RSRP}^{PSSCH,(e)}=P_{RSRP}^{PSSCH} \cdot L/N$, wherein N denotes the number of subbands of $R_{x,y+j \cdot P_A}$, $R_{x,y+j \cdot P_A}$ overlaps with the resource Y on L subbands; or $P_{RSRP}^{PSSCH,(e)}=P_{RSRP}^{PSSCH} \cdot L'/N'$, wherein N' denotes the number of PRBs of $R_{x,y+j \cdot P_A}$, $R_{x,y+j \cdot P_A}$ overlaps with the resource Y on L' PRBs.

In some embodiments, wherein the determining the total received energy reference value of the other device comprises:

if the resources are selected in subframe n, removing impact of received power on released resources, and determining the total received energy reference value of subbands of a subframe after subframe n.

In some embodiments, the determining the total received energy reference value of the another device comprises:

receiving, data in the subframe/subband in a sensing window without occupying the subframe/subband after subframe n with the other device, if the selecting resources is performed in subframe n and the total received energy of the subframe/subband in the sensing window is used for determining the received energy reference value of a subframe/subband after subframe n;

removing an impact of the received power of the other device, measuring the total received energy of the subframe/subband in the sensing window; or removing the impact of the received power of the other device to obtain the total received energy reference value of the subframe/subband after subframe n.

In some embodiments, the determining the total received energy reference value of the another device comprises:

receiving, data in the subframe/subband in a sensing window without occupying the subframe/subband after subframe n with the another device, if the resources are selected in subframe n and the total received energy of the subframe/subband in the sensing window is used for determining the received energy reference value of a subframe/subband after subframe n, the subframe/subband after subframe n is occupied with the other device which does not transmit data in subframe/subband of the sensing window;

adding an impact of the received power of the other device and measuring the total received energy of the subframe/subband in the sensing window; or adding the impact of the received power of the other device, to obtain the total received energy reference value of the subframe/subband after subframe n.

In some embodiments, the determining the total received energy reference value of the other device comprises:

for a subframe/subband in the sensing window, removing signals of a data channel scheduled by a correctly received SA, measuring the total received energy of all remaining signals on the subframe/subband;

determining the total received energy reference value of the remaining signals of a subframe/subband after subframe n according to the total received energy of the remaining signals on the subframe/subband in the sensing window, wherein the selecting resource is performed in subframe n;

for the subframe/subband after subframe n, determining according to a received SA a received power reference value of a device transmitting the SA on the subframe/subband, and obtaining the total received energy reference value according to the total received energy reference value of the remaining signals and the received power reference value.

In some embodiments, the removing the signals of the data channel scheduled by the correctly received SA comprises:

removing the signals of the data channels scheduled by all correctly received SAs; or if a received power of a data channel scheduled by the SA exceeds a threshold, removing the signals of the data channel scheduled by the SA.

According to an embodiment of the disclosure, a device for data transmission, comprising:

a sensor; a transmitter/receiver; and a processor configured to control the sensor to sense a scheduling assignment (SA) of another device and measure a received power of the other device, and measure a total received energy of a subframe/subband; determine a received power reference value and a total received energy reference value of the other device according to the SA and select resources; and control the transmitter/receiver to transmit data the selected resources.

According to the method provided by the present disclosure, the performance of the method which avoids collision based on SA is improved, and measurement accuracy of the total received energy of the subband is increased. Thus, resource selection/re-selection can be performed better. As such, interferences between devices can be avoided effectively.

BEST MODE FOR CARRYING OUT THE INVENTION

Figure 1:
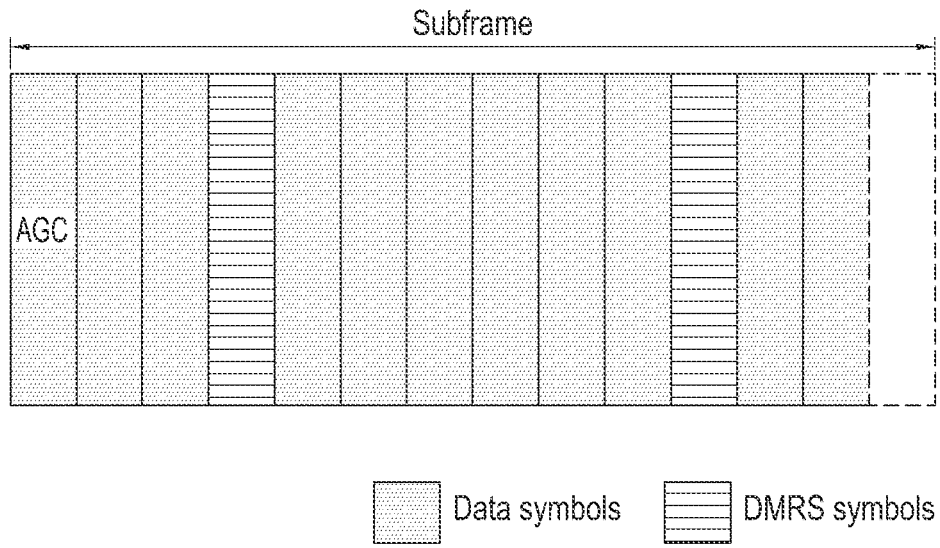
FIG. 1 is a schematic diagram illustrating an uplink subframe of an existing LTE system.
Figure 2:
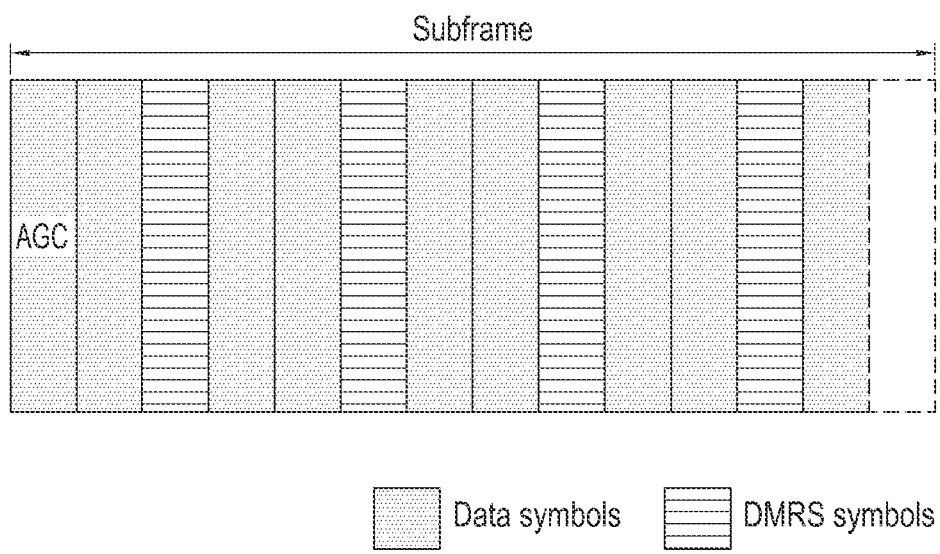
FIG. 2 is a schematic diagram illustrating an uplink subframe in which DMRS is transmitted on 4 OFDM symbols.

The present invention will be described in detail hereinafter with reference to accompanying drawings and embodiments to make the technical solution and merits therein clearer.

In V2X communications, there may be a lot of devices within a certain area, including vehicles, pedestrians and Road Side Units (RSUs), and they may all have data transmission requirements, which may lead to a high probability of collision and interferences when the devices transmit data.

For one device, since its data is generated periodically, the device needs to occupy resources periodically. In addition, each data may be retransmitted for K times, K is larger than or equal to 1, so as to avoid that the data cannot be received by other devices due to the restriction of half-duplex mode. Accordingly, the device occupies resources with a periodicity of P, and occupies K subframes within one period. In other words, K resources are allocated to the device, and each resource is allocated periodically with a periodicity of P. For one device, after selecting certain resources and occupying the resources for several periods, the device releases the resources and performs resource selection again. This is to avoid continuous collision if an adjacent device selects the same resources. During each time of resource selection/re-selection, it is possible to randomly generate, within the range $[P_{min}, P_{max}]$, a periodicity C during which the same resources may be continuously occupied, and then select the resources that can be continuously occupied during the C periods, wherein $P_{min}$ and $P_{max}$ are pre-defined constants or pre-configured values, e.g., respectively 5 and 15. Then, subtract 1 from a resource re-selection counter after each time of data transmission. When the value of the resource re-selection counter is returned to zero, the resource re-selection is performed.

Suppose that a data transmission mechanism of the device is as follows: firstly, the device transmits a control channel, hereinafter referred to as Scheduling Assignment (SA), for indicating information such as time-frequency resources occupied by a data channel and modulation and coding scheme (MCS) of the data channel; then, the device transmits data on the scheduled data channel For a LTE D2D/V2X system, the above SA is also referred to as PSCCH and the data channel is also referred to as PSSCH. As to the information carried by the SA, the SA may include indication information indicating whether the device continues to occupy the currently allocated subframe/subband in one or more subsequent periods (hereinafter, subframe/subband can mean subframe and subband). The above subframe/subband refers to one subband in one subframe and is a unit for resource allocation. One subband may include one or more continuous PRBs. The data channel of one device may occupy one or more subbands in one subframe. If there is no such indication information, device A may fixedly regard that device B continuously occupy the currently allocated subframe/subband in the next period. This manner may avoid possible collision. But if the device B releases the resources in the next subframe, the resources cannot be effectively utilized for resource selection/re-selection. Alternatively, device A may record the number of periods that device B occupies the same resources. If detecting that device B has continuously occupied the resources for $P_{max}$ times, device A may regard that device B has released the resources. Generally, if device A receives the SA of device B and the resources allocated by the SA are not released after subframe n, device A regards that device B continues to occupy the resources after subframe n.

Figure 3:
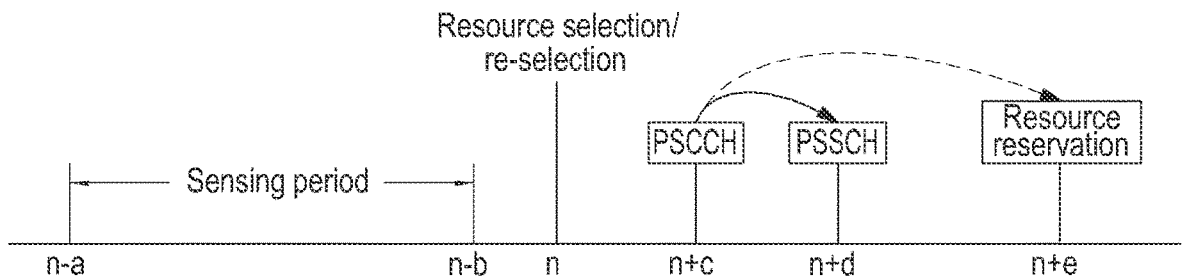
FIG. 3 is a schematic diagram illustrating a sensing-based channel resource selecting/re-selecting procedure.

According to the resource selection/re-selection mechanism as shown in FIG. 3, assume that device A performs resource selection/re-selection in subframe n, and is able to determine the resource occupation situation after subframe n according to a sensing result in subframes [n-a, n-b], hereinafter referred to as a sensing window, so as to select/re-select appropriate resources for SA and the data channel Within the sensing window, device B generally transmits data in multiple periods and transmits the same data for multiple times within one period. Accordingly, device A performs multiple measurements to device B. For one measurement, an average of received powers on all subbands occupied by device B may be obtained; or, a received power on each subband occupied by device B may be obtained. For example, the received power may be the received power on one subband, or the received power on one PRB, or the received power on one subcarrier.

Figure 4:
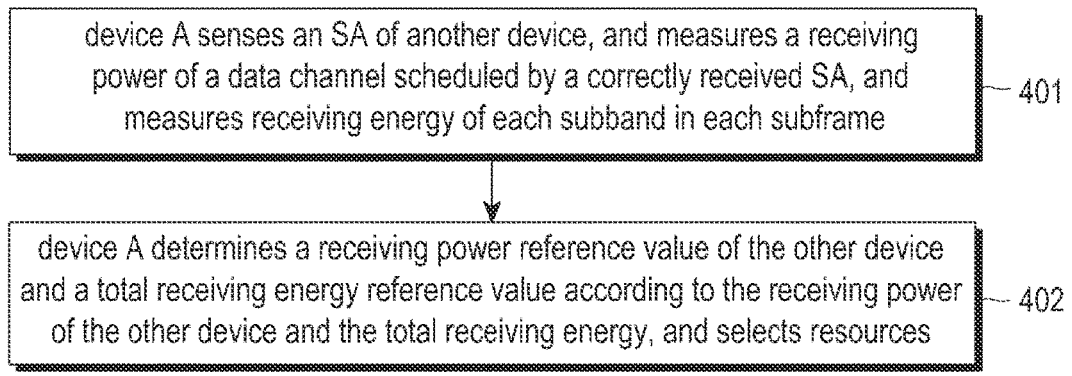
FIG. 4 is a flowchart illustrating a method of sensing channel and selecting/re-selecting channel resources according to some embodiments of the present disclosure.

In order to avoid collision and reduce interferences between devices as much as possible, some embodiments of the present disclosure provide a method as shown in FIG. 4.

In step 401, device A senses an SA of another device, and measures a received power of a data channel scheduled by a correctly received SA, and measures received energy of each subband in each subframe.

After decoding an SA and obtaining information of the SA, device A may obtain accurate information about the channel occupied by the device transmitting the SA. For a successfully decoded SA, received power of the SA of the device transmitting the SA may be further measured, so as to assist the resource selection/re-selection. The received power of the SA may be measured. Since the transmission powers of the SA and the data channel transmitted by the same transmitting device are not independent, e.g., in the case that the received power of the SA is high, the received power of the data channel is generally also high, the received power of the SA is able to reflect the received power of the data channel of the device transmitting the SA. Or, it is also possible to measure the received power of the data channel scheduled by the SA, e.g., the received power of DMRS.

Another kind of information may be used for assisting the resource selection/re-selection is a total received energy of each subframe/subband in a resource pool. The total received energy refers to the total received energy on one subband, i.e., if multiple transmitting devices transmit signals on one subband, the above energy refers to the total energy of combined signals of the multiple transmitting devices. If device A does not receive the SA, the above energy may still be used for assisting the resource selecting/re-selection. However, due to lack of necessary information about future resource occupation, the performance of device A during resource selection/re-selection is affected.

In step 402, device A determines a received power reference value of the other device and a total received energy reference value according to the received power of the other device and the total received energy of each subframe/subband, and selects resources according to the received power reference value and the total received energy reference value.

Suppose that the SA includes an identifier of device B. Thus, it is possible to recognize the resources occupied by device B in multiple periods according to the identifier. These resources may be used for obtaining the received power reference value of device B. Otherwise, suppose that the SA does not include the identifier of device B. If the SA indicates resources for initial transmission and re-transmission of one data, after receiving the SA, device A merely knows that resources occupied by the data for initial transmission and retransmission scheduled by the SA are from the same device B. As such, it is merely able to obtain the received power when device B transmits the data according to the initial transmission and re-transmission resources.

For device B, in some cases, device A may miss an SA of device B due to some reasons, e.g., SA decoding error due to collision, or, device A is performing a transmission operation when device B transmits the SA and therefore cannot receive the SA. In the sensing window [n-a, n-b], for one of the K resources corresponding to device B, assume that device A does not receive the SA in one period, device A may still able to process the resource in this period according to other SAs of the device B and measure the received power on this resource. Assume that device A misses the last one or more SAs before the sensing window ends, device A may still able to determine the resource occupation situation of device B after subframe n according to other SAs of device B.

For device B, in some cases, device A may miss the data channel on one resource of device B for some reasons, e.g., SA decoding error due to collision, or, device A is performing a transmission operation when device B transmits the data channel and therefore cannot receive the data channel In addition, according to the resource selection/re-selection mechanism as shown in FIG. 3, assume that device A successfully receives the SA of device B at a position close to the end of the sensing window [n-a, n-b], e.g. the subframe close to subframe n-b, but the data channel scheduled by this SA is later than subframe n-b, i.e., device A has not receive the data channel transmission yet in the sensing window or has no enough time to process the data channel transmission, and thus cannot measure the received power of the data channel of device B. In one period, assume device A does not receive the data channel of device B on one resource. At this time, device A is able to estimate the received power on this resource of the current period according to the measurement of other signals. For example, the received power in this period may be obtained based on the received power of device B on this resource in other periods; or, the received power of device B on the resource may be obtained based on the received power on other resources; or, the received power of device B may be obtained according to the measurement of SA of device B. As to the method based on the measurement of SA, it is possible to measure the received power based on the SA only when the SINR of the current SA is relatively high, so as to ensure measurement accuracy. Device A may configure the received power of device B on this resource to a value, e.g., a large value, such that the resource of device B is unavailable for device A after subframe n. Therefore, it is not required to consider the received power on this resource in the current period. In particular, if device A does not receive any data transmission of device B within the sensing window, the method for measuring received power based on the SA may be adopted, or the method that directly configuring the received power to a large value may be adopted.

In the sensing window, as to the subframes in which device A transmits SA and/or data channel, due to the restriction of the half-duplex mode, device A cannot measure the received power of other devices or measure the total received energy, i.e. device A misses the measurement of other devices in these subframes. When device A performs resource selection/re-selection in subframe n, in order to avoid impact to other devices transmitting data in the subframe occupied by device A in the sensing window, it is required to process the subframes occupied by device A. For the situation that the SA of one device and the data channel scheduled by the SA are located in the same subframe, in the subframe occupied by device A, device A misses both the SA and the data transmission of the other device. Device A processes the subframe occupied by device A when dealing with resource reservation after subframe n. Assume that the SA of one device and the data channel scheduled by the SA are in different subframes, if device A merely misses the SA or the data transmission of the other device, according to the above method, device A may still be able to measure the received power of this device. In this situation, device A does not need to perform additional processing to the subframe occupied by itself; or, considering that device A may also miss both the SA and the data transmission of the other device, device A may also process the subframe occupied by itself when dealing with the resource reservation after subframe n.

In a first method for processing the subframe occupied by device A, for a subframe m occupied by device A in the sensing window, subframes corresponding to subframe m after subframe n are reserved for all possible periodicities $P_q$, $P_q \in Q$, the reserved subframes are not used for transmission of device A. In other words, all subframes $m+k \times P_q$, $P_q \in Q$ after subframe n cannot be used for the transmission of device A. Assume that all of the possible periodicities are times of a minimum periodicity $P_0$, e.g., $P_0=100$ ms, all subframes $m+k \times P_0$ after subframe n cannot be used for the transmission of device A, k is an integer larger than or equal to 1. Herein, suppose that device A needs to select resources and occupy C periods after subframe n. Therefore, subframes meeting $m+k \times P_0$ in C periods after subframe n are not used for transmission of device A.

In a second method for processing the subframe occupied by device A, for a subframe m in the sensing window occupied by device A, subframes corresponding to subframe m after subframe n may be reserved for some periods having high missing probability. Assume the minimum periodicity is $P_0$ the interval between subframe m and the end position n-b of the sensing window is $M=\lfloor(n-b-m)/P_0\rfloor$ minimum periodicities. Assume that the periodicity of other device is smaller than or equal to $M \times P_0$, the other device still has at least one transmission chance in the sensing window. Device A may be able to detect the transmission of the other device according to the last transmission, such that the impact to the periodicity which is smaller than or equal to $M \times P_0$ may be not considered. It is possible to configure that all subframes $m+k \times P_q$ after subframe n cannot be used for transmission of device A, $P_q$ is larger than $M \times P_0$, k is an integer larger than or equal to 1. Similarly, assume that device A needs to select resources and occupy C periods after subframe n, therefore all subframes meeting $m+k \times P_q$ in C periods after subframe n cannot be used for transmission of device A, wherein $P_q$ is larger than $M \times P_0$.

In a third method for processing the subframe occupied by device A, for a subframe m in the sensing window occupied by device A, subframes corresponding to subframe m after subframe n may be reserved according to the periodicity of device A. Assume that the periodicity of device A is P, thus all subframes $m+k \times P$ after subframe n cannot be used for transmission of device A. Herein, assume that device A needs to select resources and occupy C periods after subframe n, therefore all subframes meeting $m+k \times P$ in C periods after subframe n cannot be used for transmission of device A.

When selecting/re-selecting resources in subframe n, device A selects the resources in a selecting window. The values of and depend on the implementation of UE. For example, $[n+T_1, n+T_2]$. The values of $T_1$ and $T_2$ depend on the implementation of UE. For example, $T_1 \leq 4$ and $20 \leq T_2 \leq 100$. The value of $T_1$ depends on the processing delay of the UE from selecting resources to starting to transmit SA and data. The value of $T_2$ depends on the delay tolerance characteristic of the current service.

In a fourth method for processing the subframe occupied by device A, assume the SA merely indicates whether the resource is released or continuously occupied in a next period. For a subframe m occupied by device A in the sensing window, all subframes $z=m+P_q$ after subframe n are not used for transmission of device A, wherein $P_q$ denotes periodicity of resource reservation, $P_q \in Q$. The set Q of the periodicities may be semi-statically configured by higher layer; or the set Q of the periodicities may include merely one element, e.g., a minimum periodicity $P_0$ or resource reservation periodicity $P_A$ when device A currently performing resource re-selection. The resource of a single subframe within the selection window $[n+T_1, n+T_2]$ is denoted by $R_{x,y}$, i.e., $R_{x,y}$ is subframe y and includes one or more continuous subbands starting from subband x. If there is a value j which makes $y+j \cdot P_A=z$, $R_{x,y}$ is not usable for device, j may be an integer larger than or equal to 0, or j is an integer larger than or equal to 0 and smaller than C, C is the number of periods that device A needs to reserve resources according to the periodicity A.

In a fifth method for processing subframe occupied by device A, assume that SA merely indicates whether the resource is released or continuously occupied in the next period. For a subframe m occupied by device A in the detection window, assume that all possible periodicities are multiples of a minimum periodicity $P_0$, e.g., $P_0=100$ ms. Thus, all subframes $z=m+k \times P_0$ after subframe n are not usable for device A, wherein k is any integer, or k is an integer larger than or equal to 1 and smaller than $\max(P_q)/P_0$. Assume that there is a value k which makes $z=m+k \times P_0$ located within the selection window $[n+T_1, n+T_2]$, all single subframe resources in subframe z in the selection window are not usable for device A.

In the sensing window, device A generally transmits in multiple subframes. Device A may occupy some resources and release these resources in the sensing window, and device A re-selects and occupies other resources. According to the above method, it is possible to process the subframes within the sensing window occupied by device A after the last resource re-selection, or process all of the subframes occupied by device in the sensing window.

According to the above method, it is possible to process the subframe used for transmitting SA and the subframe used for transmitting data occupied by device A in the sensing window. Or, if the SA of one device and the data channel scheduled by the SA are in different subframes, since the SA may be transmitted in any subframe, the situation that the device cannot receive the transmission of other devices due to the transmission of the SA is occasional and may not happen repeatedly, it is possible to process the resource reservation after subframe n merely for the subframes in which device A transmits data in the sensing window. Or, if the SA of one device and the data channel scheduled by the SA are in different subframes, besides processing resource reservation after subframe n for the subframes in which device A transmits data in the sensing window, resource reservation after subframe n is merely performed for the subframes in which SA is transmitted in the last X periodicities in the sensing window, wherein X is a predefined constant or a value configured by higher layer signaling, e.g., X=1.

Assume that device A performs resource selection/re-selection in subframe n. For device B, assume that device A correctly decodes the SA of device B and the resources allocated for the SA are not released after subframe n. Thus, it is possible to determine a received power reference value of device B after subframe n according to a received power measurement value of device B in the sensing window. Specifically, assume that the SA does not include the identifier of device B. If the SA indicates the initial transmission resources and the retransmission resources corresponding to one data, it is merely possible to obtain the received power reference value of device B after subframe n according to the received power measurement value on the initial resources and the retransmission resources scheduled by the SA. The method for obtaining the received power reference value based on the received power measurement value is not restricted in the present disclosure. Then, according to the SAs of various devices received in the sensing window, it may be determined whether the resource after subframe n is available for the transmission of device A according to scheduling information of the SAs and the received power reference values of corresponding devices.

In addition, device A may determine the resource occupation situation after subframe n according to some known or configured resource occupation periodicity information. Through determining a received energy reference value of one subframe/subband after subframe n according to a received energy measurement value on each subband in the resource pool in the sensing window, interference may be avoided as much as possible. For example, for a subband in subframe y after subframe n, the received energy reference value may be obtained according to the received energy measurement value of the same subband in subframes $y-k \times P_A$ in the sensing window, or may be obtained according to the received energy measurement value of the same subband in subframe $y-k \times P_A$ before the end of the sensing window, wherein k is a positive integer. For a subframe, if device A occupies this subframe for transmission and thus does not measure the received energy, this subframe is not used for calculating the received energy reference value. The received energy reference value may be an average value, a weighted average value or a moving average value of received energy measurement values of the above subframes. For the V2X system, the device participating in the communication may move rapidly. For example, for two devices move with a relative velocity of 180 km/h, their relative position varies 50 m within one second, which may lead to a large variance of the received energy. That is, due to the high moving speed, the received energy measurement value adjacent to subframe n reflects the current situation more accurately. Therefore, for the weighted average operation and moving average operation, the weight of the received energy measurement value of the subframe adjacent to subframe n is relatively large. The method for obtaining the received energy reference value based on the received energy measurement value is not restricted in examples of the present disclosure.

Embodiment 1

Device A senses an SA of another device in the sensing window. According to the correctly received SA, if the resource allocated by the SA is not released after subframe n, device A may obtain the resource occupation situation of said another device after subframe n. Herein, if device A does not sense one or more SAs of device B, device A may still be able to determine the resource occupation situation of device B after subframe n according to other received SAs of device B.

Figure 5:
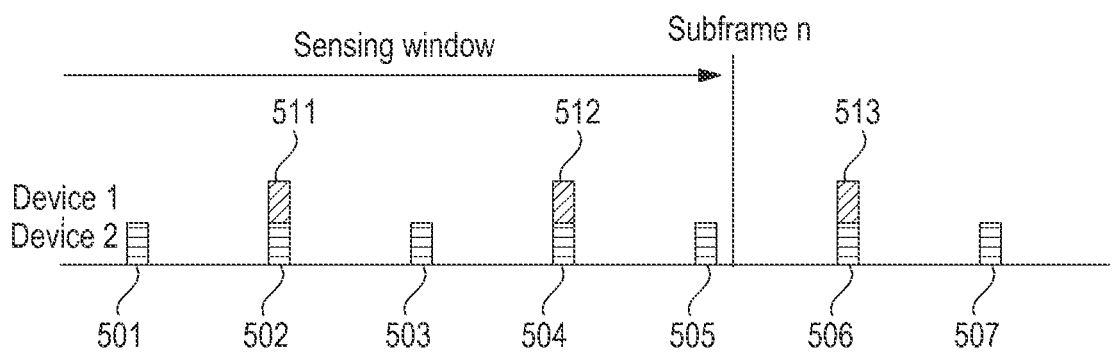
FIG. 5 is a schematic diagram illustrating data channel occupation of two devices in the case that the periodicity of one device is a multiple of the other.
Figure 6:
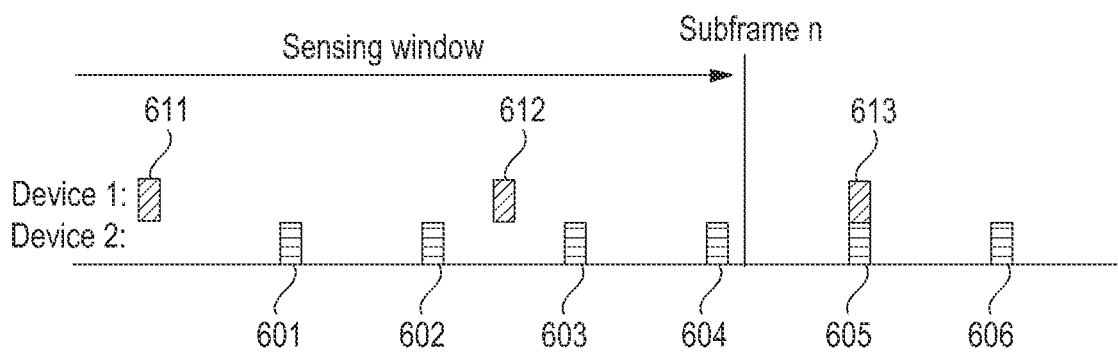
FIG. 6 is a schematic diagram illustrating data channel occupation of two devices in the case that the periodicity of one device is not a multiple of the other.

According to the SA successfully received by device A in the sensing window, for one subframe/subband after subframe n, there may be one or more devices need to transmit data in this subframe/subband. For example, in the sensing window, device A may successfully decode multiple SAs, the data channels scheduled by them are in the same subframe, and the subbands are completely the same or partially the same. Assume that the resources allocated by the SAs are not released after subframe n, the data channels of the multiple devices may still occupy the same subframes/subbands after subframe n. The resource occupation periodicities of the devices may be the same, and they occupy the same subframes/subbands in continuous periods after subframe n; or, their periodicities may be multiples of each other or not, they merely occupy the same subframes/subbands in some particular periods after subframe n. As shown in FIG. 5, assume that device 1 has a periodicity of 200 ms and occupies resources 511 and 512; whereas the device 2 has a periodicity of 100 ms and occupies resources 501~505, wherein resources 511 and 502 overlap with each other, and resources 512 and 504 overlap with each other. After subframe n, some transmissions (513 and 506) still occupy the same subframes. In fact, since the time that different devices starts the data transmission may be different, in the sensing window, device A may successfully decodes multiple SAs, wherein subbands scheduled by the SAs are completely or partially the same, but the data channels scheduled by the SAs are in different subframes. However, the SAs may still occupy the same subframe/subband after subframe n. As shown in FIG. 6, device 1 has a periodicity of 500 ms and occupies resources 611 and 612; whereas device 2 has a periodicity of 200 ms and occupies resources 601~604. Thus, after subframe n, some transmissions (613 and 605) may still occupy the same subframe.

For a subframe/subband, if there is merely one device B needs to occupy the subframe/subband for data transmission, the received power reference value of device B in this subframe/subband may be compared with a threshold Th, if the received power reference value exceeds the threshold Th, the subframe/subband is not usable for device A. The threshold Th may be predefined or configured by higher layer.

For a subframe/subband, if there are K devices need to occupy the subframe/subband for data transmission, the received power reference value of each of the K devices in the subframe/subband may be compared with a corresponding threshold Th, the threshold Th may be different or the same for different devices. If the received power reference value of at least one of the devices in the subframe/subband exceeds its threshold Th, the subframe/subband is not usable for device A.

In the above method, the value of Th may depend on one or more parameters of device A. For example, the value of Th may be relevant to the moving speed of device A. For example, the faster the moving speed, the faster the received power varies. A relatively small Th may be used to avoid collision as much as possible. Or, the value of Th may be relevant to the service priority of device A. For example, for a service with a high priority, in order to obtain more available resources and ensure the transmission performance of the high priority service of device A, a relatively large Th may be adopted; or, from the perspective of view of avoid collision, a relatively small Th may be adopted. Or, the value of Th may be relevant to the service type of device A. For example, for a periodically transmitted service, since the interference may emerge repeatedly in multiple periods, a relatively small Th may be adopted, so as to avoid collision as much as possible. For an event-triggered service, since the interference is a one-time event and does not last for a long time, a relatively large Th may be adopted. Or, the value of Th may be relevant to the transmission power of device A, the higher the transmission power, the larger the interference to other devices. Through configuring a relatively small Th, the collision may be reduced.

Alternatively, the value of Th may depend on one or more parameters of device B, such that the value of Th may be different when device A processes with respect to different devices B. For example, the value of Th may be relevant to the moving speed of device B. For example, the faster the moving speed, the faster the received power varies. A relatively small Th may be adopted to reduce collision as much as possible. Or, the value of Th may be relevant to the service priority of device B. For example, for a service with a high priority, in order to avoid collision better and improve the transmission performance of device B, a relatively small Th may be adopted. Or, the value of Th may be relevant to the service type of device B. For example, for a periodically transmitted service, since the similar interference may emerge repeatedly in multiple periods, a relatively small Th may be adopted to avoid collision as much as possible. For an event-triggered service, since the interference is a one-time event or does not last for a long time, a relatively large Th may be adopted. Or, the value of Th may be relevant to the transmission power of device B. The higher the transmission power, the higher the interference to the other device. Through configuring a relatively small Th, the collision may be reduced.

Alternatively, the value of Th may be determined based on a combination of one or more the above parameters of device A and one or more of the above parameters of device B. For example, the threshold for the received power reference value of device B may be determined according to a relationship between the service priorities of device A and device B. Or, the threshold for the received power reference value of device B may be determined according to a combination of the service types of device A and device B. Or, the threshold for the received power reference value of device B may be determined according to a combination of the moving speed of device A and the relationship between the service priorities of device A and device B.

For device B, assume that device B needs to occupy resource Y after subframe n, Y may include one or more continuous subbands, and the received power reference value $P_{RSRP}^{PSSCH}$ on resource Y exceeds the corresponding threshold Th. Candidate resources of the selection window may be processed according to the resource Y. Suppose that $R_{x,y}$ denotes a single subframe resource in selection window $[n+T_1, n+T_2]$, i.e., $R_{x,y}$ is located in subframe y and includes one or more continuous subbands starting from subband x. Hereinafter, the method that device A determines whether $R_{x,y}$ needs to be excluded is described. Herein, suppose that the resource reservation periodicity that device A performs resource selection/re-selection is $P_A$.

Figure 12:
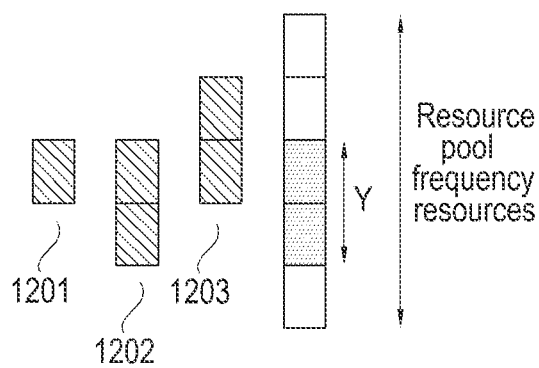
FIG. 12 is a schematic diagram illustrating candidate resources in a selection window according to some embodiments of the present disclosure.

In a first resource exclusion method, if the PRBs of $R_{x,y+j \cdot P_A}$ and the PRBs of the resource Y completely overlap or partially overlap, $R_{x,y}$ is unusable for device A, wherein j is an integer larger than or equal to 0, or j is an integer larger than or equal to 0 and is smaller than C, C is the number of periods that device A needs to reserve resources according to the periodicity $P_A$. According to this method, either both the candidate resources 1202 and 1203 in the selection window as shown in FIG. 12 are unusable for device A, or both of them are usable for device A. If both resources 1202 and 1203 are usable, device A may randomly select one resource from resources 1202 and 1203 and other candidate resources. As such, interference characteristic difference between resources 1202 and 1203 and resource Y cannot be reflected, which may lead to decrease of system performance. In particular, since resource 1203 has less overlapped part with resource Y, the interference is lower. Thus, device A may select resource 1203 preferably.

In a second resource exclusion method, if the PRBs of $R_{x,y+j \cdot P_A}$ and the PRBs of resource Y completely overlap or partially overlap, the received power reference value $P_{RSRP}^{PSSCH}$ of the resource Y may be processed, denoted by $P_{RSRP}^{PSSCH,(e)}$, and it is determined whether $R_{x,y}$ is usable for device A according to $P_{RSRP}^{PSSCH,(e)}$. In other words, if $P_{RSRP}^{PSSCH,(e)}$ exceeds the above threshold Th, $R_{x,y}$ is unusable for device A, wherein j is an integer larger than or equal to 0, or, j is an integer lager than or equal to 0 and is smaller than C, C is the number of periods that devices A needs to reserve resources according to the periodicity $P_A$. Assume that the number of subbands of $R_{x,y+j \cdot P_A}$, the number of overlapped subbands between 111 and resource Y is L, i.e., the transmission of device A on the N subbands of $R_{x,y+j \cdot P_A}$ merely interfere with the resource Y on L subbands. The interference is decreased. Therefore, $P_{RSRP}^{PSSCH,(e)}=f(P_{RSRP}^{PSSCH}, L, N)$. For example, $P_{RSRP}^{PSSCH,(e)}=P_{RSRP}^{PSSCH} \cdot L/N$. Or, assume the number of overlapped PRBs of $R_{x,y+j \cdot P_A}$ is N', the number of overlapped PRBs between $R_{x,y+j \cdot P_A}$ and resource Y is L', i.e., the transmission of device A on the N' PRBs of resource $R_{x,y+j \cdot P_A}$ merely interfere with the resource Y on L' PRBs. The interference is decreased. Therefore, e.g., $P_{RSRP}^{PSSCH,(e)}=f(P_{RSRP}^{PSSCH}, L', N')$, e.g., $P_{RSRP}^{PSSCH,(e)}=P_{RSRP}^{PSSCH} \cdot L'/N'$. Hereinafter, the subband is taken as an example to describe the method. The method is also applicable when PRB is taken as a unit.

According to the second resource exclusion method, if the subbands of $R_{x,y+jP_A}$ is a subset of the subbands of resource Y, e.g., the candidate resource 1201 in the selection window as shown in FIG. 12, there is further a situation that the subbands of $R_{x,y+jP_A}$ completely overlap with the subbands of resource Y, e.g., the candidate resource 1202 in the selection window as shown in FIG. 12, $P_{RSRP}^{PSSCH,(e)}=P_{RSRP}^{PSSCH}$, to provide a complete protection to the resource Y to avoid collision. Otherwise, since the transmission of device A on N subbands of $R_{x,y+jP_A}$ merely has interference to the resource Y on L subbands, i.e., merely a part of the transmission power of device A may impact the transmission on resource Y, e.g., the candidate resource 1203 in the selection window as shown in FIG. 12. Through configuring $P_{RSRP}^{PSSCH,(e)}=f(P_{RSRP}^{PSSCH}, L, N)$, it is avoided that the resource $R_{x,y}$ is excluded too conservatively. For resource 1203, $P_{RSRP}^{PSSCH,(e)}=P_{RSRP}^{PSSCH}=L/N=P_{RSRP}^{PSSCH}/2$, i.e., $P_{RSRP}^{PSSCH,(e)}$ is decreased by 3 dB compared to $P_{RSRP}^{PSSCH}$. According to 3GPP specifications, after the resource is excluded according to the received power, if the ratio of the number of remained candidate resources and the total number of resources is smaller than R, e.g., R=20%, device A increases the above threshold Th by 3 dB, and performs the resource exclusion again. Herein, the increase of the threshold Th is performed by a step of 3 dB. According to the above method, the $P_{RSRP}^{PSSCH,(e)}$ of resource 1203 is lower than $P_{RSRP}^{PSSCH}$ by 3 dB, the partially overlapped resource 1203 is easier to become usable resource than the completely overlapped resource 1202. As such, device A has a higher probability to select resource 1203 than resource 1202, which helps to reduce interference between devices.

Embodiment 2

According to the method of embodiment 1, a device A senses an SA of another device in the sensing window. According to a correctly received SA, if the resources allocated by the SA are not released after subframe n, device A may obtain the resource occupation situation of the other device after subframe n. Herein, if device A does not sense one or more SAs of device B, device A may still be able to determine the resource occupation situation of device B after subframe n according to other SAs of device B. Herein, according to the SA successfully received by device A in the sensing window, for one subframe/subband after subframe n, there may be one or more other devices need to transmit data on the subframe/subband.

For one subframe/subband, assume that there are K other devices need to transmit data in the subframe/subband, K is larger than or equal to 1. Device A may respectively obtain K received power reference values of the K other devices according to receiving operations in the sensing window. In the method of embodiment 1, if the received power reference value of at least one UE exceeds the corresponding threshold Th, the subframe/subband is unusable for device A. In addition, there may be a situation that, the received power reference values of the K devices are all smaller than their corresponding threshold Th. According to the method of embodiment 1, the subframe/subband is usable for device A. In fact, since device A has sensed that there are multiple devices transmitting data simultaneously on the subframe/subband, although the received power reference value of each device is lower than the threshold, the subframe/subband may already have a high load. Therefore, embodiments of the present disclosure provide that device A may determine whether to occupy the subframe/subband according to a combination of the received power reference values of the K devices.

In a first method for determining whether to occupy the subframe/subband: device A obtains a sum of the received power reference values of the K other devices, and compares the sum of the received power reference values with a threshold Th2. If the sum is larger than Th2, the subframe/subband is unusable for device A. The threshold Th2 may be pre-defined or configured by higher layer. Similarly as embodiment 1, the threshold Th2 may be common for different devices; or the threshold Th2 may be determined according to one or more parameters of device A, including moving speed, service priority, service type, and transmission power, etc.; or, for one other device, the threshold Th2 may be determined according to one or more parameters of the other device, including moving speed, service priority, service type and transmission power, etc.; or, the threshold Th2 may be determined according to a combination of one or more parameters of device A and one or more parameters of the other device. The threshold Th2 may be the same as the threshold Th determined in embodiment 1. For example, the threshold Th is common for all of the other devices or is determined according to parameters of device A, thus Th2 may be equal to Th. Or, the threshold Th2 may be different from the threshold Th, e.g., Th2=Th+Δ, wherein Δ is a predefined constant, or a value configured by higher layer or determined via other methods. Or, according to the method of embodiment 1, the thresholds Th of the K devices may be different, and Th2 may be determined according to a minimum value among the thresholds Th of the K devices, so as to avoid simultaneous transmission in one subframe/subband as much as possible. Or, it may be determined according to a maximum value among the thresholds Th of the K devices, so as to provide more available resources for selection/re-selection. Or, it may be determined according to an average value of the thresholds Th of the K devices. As to the situation that the thresholds Th of the K devices are different, besides determining a threshold Th2' according to the above method, an offset Δ may be further introduced, i.e., Th2=Th2'+Δ, wherein Δ is a predefined constant, or a value configured by higher layer or determined via other methods.

In a second method for determining whether to occupy the subframe/subband, device A divides the K devices into groups, and obtains a sum of received power reference values of each group of devices, and compares the sum with a corresponding threshold Th3. If the sum of received power reference values of at least one group exceeds Th3, the subframe/subband is unusable for device A. The groups may be divided according to one or more parameters of the K devices, e.g., moving speed, service priority, service type and transmission power, etc. For example, devices with the same service priority are divided into one group. The group division may be exclusive, i.e., each of the K devices belongs to merely one group. Or, each of the K devices may be allowed to be grouped into one or more groups. For example, all devices with high service priorities are put in one group, and a threshold Th3 is configured according to the high service priority. At the same time, all of the K devices may be put into another group, and a threshold Th3 may be configured according to a low service priority. The threshold Th3 may be predefined or configured by higher layer Similarly as embodiment 1, the threshold Th3 may be common for all devices, or may be determined according to one or more parameters of device A, including moving speed, service priority, service type and transmission power, etc. Or, for a group of devices of the K devices, the threshold Th3 may be determined according to one or more parameters of the group of devices, e.g., moving speed, service priority, service type and transmission power, etc. Or, the threshold Th3 may be determined according to a combination of one or more parameters of device A and one or more parameters of the group of devices. The threshold Th3 may be the same as the threshold Th determined in embodiment 1. For example, the threshold Th is common for all devices, or is determined based on parameters of device A. Thus, threshold Th3 may equal to Th. Or, threshold Th3 may be different from the threshold Th, e.g., Th3=Th+Δ, wherein Δ is a predefined constant or a value configured by higher layer. Or, according to the method of embodiment 1, assume that the thresholds Th of the devices in one group are different, Th3 may be determined according to a minimum value among the thresholds Th of the group of devices, so as to avoid simultaneous transmission in one subframe/subband as much as possible. Or, it may be determined according to a maximum value among the thresholds Th of the group of devices, so as to provide more resources available for selection/re-selection. Or, it may be determined according to an average value of the thresholds Th of the group of devices. For the situation that the thresholds Th of the group of devices are different, besides determining a threshold Th3' according to the above method, an offset Δ may be further introduced, i.e., Th3=Th3'+Δ, wherein Δ is a predefined constant, or a value configured by higher layer or determined via other methods.

In a third method for determining whether to occupy the subframe/subband, a threshold Th is independently determined for each of the K devices. For example, the method of embodiment 1 may be adopted. Then, the devices are divided into groups according to their thresholds, i.e. devices with the same threshold are divided into the same group, or, devices with Th within a certain range are put into the same group. Then, a sum of received power reference values of each group of devices is obtained and compared with a corresponding threshold Th4. If the sum of received power reference values of at least one group exceeds Th4, the subframe/subband is unusable for device A. The threshold Th4 of a group of devices may be the same as the threshold Th determined independently for the group of devices; or, the threshold Th4 of a group of devices may be different from the threshold Th determined independently for the group of devices, e.g., Th4=Th+A wherein Δ is a predefined constant, or a value configured by higher layer or via other methods. If devices with Th within a certain range are put into one group, Th4 may be determined according to a minimum value among the thresholds Th of the group of devices, so as to avoid simultaneous transmission in one subframe/subband as much as possible. Or, Th4 may be determined according to a maximum value among the thresholds Th of the group of devices, so as to provide more resources available for selection/re-selection. Or, Th4 may be determined according to an average of the thresholds Th of the group of devices. If the devices with Th within a certain range are put into one group, besides determining a threshold Th4' according to the above method, an offset Δ may be further introduced, i.e., Th4=Th4'+Δ wherein Δ is a predefined constant, or a value configured by higher layer or via other methods.

In the above three methods for determining whether to occupy the subframe/subband, device A may obtain the sum of received power reference values of the devices or devices of a group corresponding to some SAs that device A correctly receives, and performs the above processing. In particular, since SA usually has a low coding rate and/or high transmission power, device A may have a high probability to correctly receive the SA. In some cases, there may be a device whose SA can be decoded correctly but the received power of the data channel scheduled by the SA is very low. At this time, device A may not consider the impact of this device when performing the resource selection/re-selection. As such, a threshold Th5 may be configured. For a correctly decoded SA, if the received power reference value of the device transmitting this SA is lower than Th5, the impact of this device is ignored. For any device whose SA is correctly received, if its received power reference value is higher than Th5, the method proceeds with the method of embodiment 1 or one of the three methods for determining whether to occupy the subframe/subband in this embodiment, so as to determine whether a corresponding subframe/subband is usable for device A. Herein, since the resource occupation of some devices with low transmission power reference values have been ignored, the number of devices that device A needs to consider when determining whether a subframe/subband after subframe n is usable is reduced.

The threshold Th5 may be predefined or configured by higher layer. Similarly as embodiment 1, the threshold Th5 may be common for all devices, or may be determined according to one or more parameters of device A, e.g., moving speed, service priority, service type and transmission power, etc.; or for a device B, it may be determined according to one or more parameters of the device B, e.g., moving speed, service priority, service type and transmission power, etc.; or, it may be determined according to a combination of one or more parameters of device A and one or more parameters of device B. The threshold Th5 may be different from or the same as the threshold Th determined in embodiment 1. The threshold Th5 may be different from or the same as the thresholds Th2, Th3 or Th4.

According to the method of ignoring the resource occupation of some devices with low received power reference values according to the threshold Th5, when it is required to determine the available resources after subframe n, the method of embodiment 1 may be adopted, i.e., for a subframe/subband after subframe n, if the received power reference value of at least one device is higher than the corresponding threshold, the subframe/subband is unusable for device A. Or, assume that in a subframe/subband after subframe n, there are K' other devices need to transmit data on this subframe/subband, and the received power reference values of them are higher than their corresponding thresholds Th5, wherein K' is larger than or equal to 1. The above three methods for determining whether to occupy the subframe/subband may be adopted. As to the first method for determining whether to occupy the subframe/subband, device A obtains a sum of the received power reference values of the K' devices, and compares the sum of the received power reference values with threshold Th2. If the sum is larger than Th2, the subframe/subband is unusable for device A. Or, according to the second method for determining whether to occupy the subframe/subband, device A divides the K' devices into groups, and obtains a sum of the received power reference values of each group of devices, and compares the sum with threshold Th3. If the sum of at least one group is higher than Th3, the subframe/subband is unusable for device A. Or, according to the third method for determining whether to occupy the subframe/subband, device A divides the K' devices into groups, obtains a sum of the received power reference values of each group, and compares the sum with Th4. If the sum of at least one group is higher than Th4, the subframe/subband is unusable for device A.

Embodiment 3

According to the method as shown in FIG. 4, there may be two kinds of information for assisting device A to perform the resource selection/re-selection in subframe n. One is a method of processing the resource occupation of other devices after subframe n according to SA sensing, i.e. according to the SA of other device B correctly received in the sensing window, measure the received power of device B according to the scheduling information of the SA to obtain the received power reference value of the other device after subframe n, so as to assist the resource selection/re-selection. Another is a method of processing the resource occupation of other devices after subframe n according to the total received energy on each subframe/subband in the sensing window, i.e., device A obtains the total received energy reference value of one subframe/subband after subframe n based on the total reference energy measurement value in the sensing window according to known or configured resource occupation periodicity information, so as to assist the resource selection/re-selection. In particular, for a subframe/subband after subframe n, device A may determine a corresponding subframe/subband in the sensing window according to some known or configured resource occupation periodicity information, i.e., according to the above known or configured periodicity, assume that a device occupies channel in the corresponding subframe/subband in the sensing window, thus the device will also occupy the subframe/subband after subframe n. Therefore, it is possible to determine the total received energy reference value of a subframe/subband after subframe n according to the total received energy measurement value of the corresponding subframe/subband in the sensing window, so as to determine whether device A can use the subframe/subband. Herein, for the subframes occupied by device A in the sensing window, the impact of the subframes in the sensing window occupied by device A may be not considered when calculating the total received energy reference value. Or, for the subframes in the sensing window occupied by device A, the impact of these subframes may be processed firstly, i.e., determine some subframes after subframe n to be unusable for device A, then for other subframes after subframe n, the impact of the subframes in the sensing window occupied by device A may be not considered when calculating the total received energy reference value. Or, if the corresponding subframe/subband in the sensing window is the subframe occupied by device A in the sensing window, device A cannot use a subframe/subband after subframe n. Or, if the corresponding subframe/subband in the sensing window is the subframe occupied by device A in the sensing window, suppose that the subframe is m, a minimum periodicity is P0, the interval between the subframe m and the end position of the sensing window is $M=\lfloor(n-b-m)/P_O\rfloor$ minimum periodicities, merely when it is determined that the periodicity for the corresponding subframe/subband in the sensing window is larger than $M\times P_O$, device A cannot use the subframe/subband after subframe n.

For a periodically transmitted service, a device may occupy resources with a periodicity P and occupy resources of K subframes in one period. For example, the K resources may be used for repeatedly transmitting the same data, so as to avoid that other devices cannot receive the data due to the half-duplex mode. In other words, K resources are allocated to the device, and each resource is allocated periodically with a periodicity P. In addition, if the device has occupied the resources for a certain number of periods, the resources should be released, so as to avoid that adjacent devices continuously use the same resources. For device A, after correctly receiving the SA of another device, device A is able to determine the subframe/subband occupied by the data channel scheduled by the SA and determine whether the subframe/subband will still be occupied in the following one or more periods according to the information carried by the SA. For example, the SA may indicate whether the resource will still be occupied in at least the next period; or the SA may indicate whether the current resources will still be occupied in the following X periods, wherein X is a predefined constant, or a value configured by higher layer or indicated dynamically. In addition, since a device releases resources after occupying the resource for a certain number of periods, device A may use this feature to assist the determination of resource occupation of other devices. For example, assume that the SA does not indicate the accurate time that the resource will be released. Device A may record the number of times that the resources have been continuously occupied. If the number reaches $P_{max}$, device A may regard that device B has released the resources.

As to an event-triggered service, the transmission may be a one-time event. It is still possible to occupy K resources to repeatedly transmit one data, so as to avoid that other devices cannot receive the service due to the half-duplex mode. However, at this time, the K resources need not be occupied repeatedly following a certain periodicity, i.e. for an event-triggered service, the resources are released after being occupied for one time.

Figure 7:
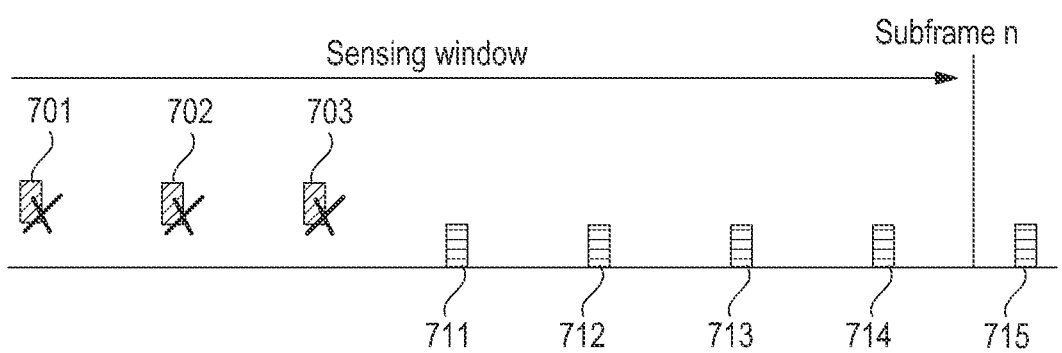
FIG. 7 is a schematic diagram illustrating release of resources.

For a periodically transmitted service, through receiving the SA, the device A may sense in the sensing window that resources are occupied by device R in C1 continuous periods, and these resources are released in the sensing window. As shown in FIG. 7, in the sensing window, the device R occupies one resource in three periods (701~703). However, in the last four periods (711-715) before the sensing window ends, device R has re-selected another resource and occupies the resource until after subframe n. For an event-triggered service, the resources occupied by device R in the sensing window are also released. It is required to design the resource processing mechanism, such that the resources which have been released do not impact the resource selection/re-selection of device A after subframe n.

On one hand, for the periodically transmitted service, in the method of processing the resource occupation of other devices after subframe n based on SA sensing and received power reference value, as to the released resources of another device R, device A does not need to consider the occupation of such resources of device R after subframe n. On the other hand, as to the method of processing the resource occupation of other devices after subframe n based on the total received energy of each subframe/subband in the sensing window, for the periodically transmitted service and the event-triggered service, since the resource occupied by device R has been released, the impact of the received power of the released resources should be eliminated when determining the total received energy reference value of each subframe/subband after subframe n. In the sensing window, for one subframe/subband occupied by device R, assume the received power measurement value of device R is $P_R$, and the total received energy of the corresponding subframe/subband is E. After the impact of the released resources occupied by device R is eliminated, the effective total received energy of the subframe/subband is $E'=E-P_R$. The effective total received energy E' may be used for determining the total received energy reference value after subframe n.

In the sensing window, through receiving the SA, device A may sense the resource occupation of another device B, and may sense that the resource is still not released at the end of the sensing window. As this time, the impact of device B needs to be considered after subframe n.

As to the method of processing the resource occupation of other devices after subframe n based on the total received energy of each subframe/subband in the sensing window, for a subframe/subband after subframe n, device A may determine a corresponding subframe/subband in the sensing window according to some known or configured resource occupation periodicity information, and determine whether device A can use the subframe/subband after subframe n according to the total received energy measurement value of this corresponding subframe/subband. The devices except for device A may be classified into three types. The first type device transmits data on the corresponding subframe/subband in the sensing window and continues to occupy the subframe/subband after subframe n following the periodicity of the first type device. The second type device transmits data on the corresponding subframe/subband in the sensing window, but according to the periodicity, the second type device does not occupy the subframe/subband after subframe n. The third type device does not transmit data on the corresponding subframe/subband in the sensing window. However, according to the periodicity of the third type device, it occupies the subframe/subband after subframe n.

For the above first type device, the total received energy measured on the corresponding subframe/subband in the sensing window has already include the impact of the first type device, no additional adjustment is required.

Figure 8:
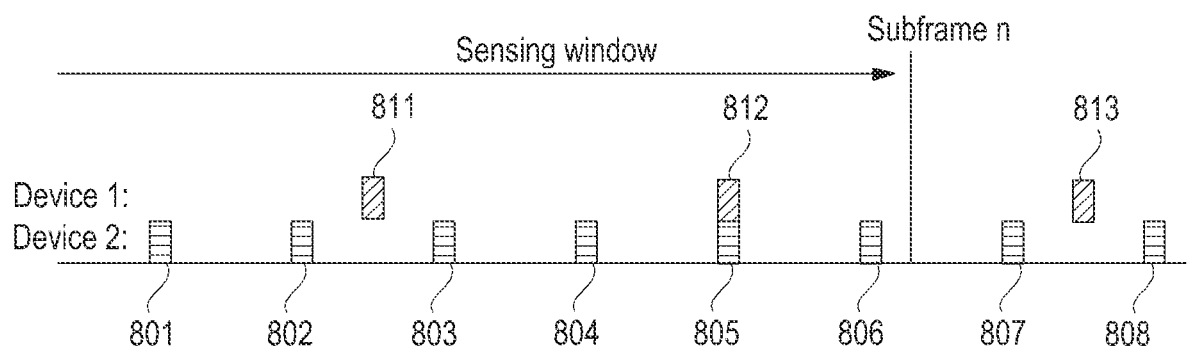
FIG. 8 is a schematic diagram illustrating a situation that the device does not occupy a subframe/subband after subframe n.

For the above second type device, the total received energy measured on the corresponding subframe/subband in the sensing window additionally include the impact of the transmission of the second type device. But in fact the second type device does not need to transmit data on the subframe/subband after subframe n, therefore the received power of the second type device needs to be removed from the total received energy measured on the corresponding subframe/subband. Or, the impact of the received power of the second type device may also be removed from the total received energy reference value of the subframe/subband after subframe n. As shown in FIG. 8, in order to obtain the total received energy reference value on resources 807 and 808 after subframe n, assume that the impact to the total receiving measurement value on resources 801~806 is considered with a periodicity of 200 ms. For device 1, its resource 812 overlaps with resource 805, i.e., the total received energy measurement value of resources 812/805 includes signal energy of device 1. However, since the SA of device 1 indicates that its periodicity is 500 ms, device 1 does not occupy resources 807 and 808 after subframe n.

Therefore, the impact of the received power of device 1 needs to be eliminated from the total received energy of resources 812/805, so as to obtain an effective total received energy of resources 812/805. The above effective total received energy and the total received energy of resources 801~804/806 are used for determining the total received energy reference value of resources 807 and 808. Assume that the total received energy measurement value of the corresponding subframe/subband in the sensing window is E, the received power measurement value of the second type device B is $P_B$. Thus, the effective total received energy of the subframe/subband may be corrected to $E'=E-P_B$, so as to obtain a more accurate total received energy reference value according to the effective total received energy measurement value. Alternatively, it is also possible to calculate the total received energy reference value of resources 807 and 808 according to the total received energy measurement value of resources 801~806, and then eliminate the impact of the received power of device 1, so as to obtain the total effective energy reference value for determining whether resources 807 and 808 are usable.

Figure 9:
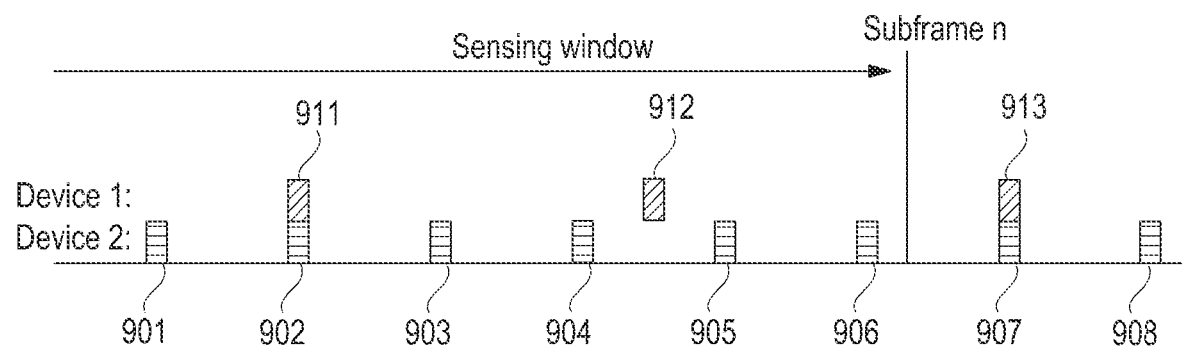
FIG. 9 is a schematic diagram illustrating a situation that the device occupies a subframe/subband after subframe n.

For the third type device, the total received energy measurement value obtained on the corresponding subframe/subband in the sensing window does not consider the impact of the transmission of device B. However; the third type device in fact needs to transmit data on the subframe/subband after subframe n. Therefore, the received power of the third type device needs to be included in the total received energy measured on the corresponding subframe/subband. Alternatively, it is also possible to include the received power of the third type device in the total received energy reference value of the subframe/subband after subframe n. As shown in FIG. 9, in order to obtain the total received energy reference value of resource 907 after subframe n, assume that the impact to the total received energy measurement value on resources 901~906 is considered with a periodicity of 200 ms. Herein, since the SA of device 1 indicates that its periodicity is 500 ms, merely the resource 911 of device 1 overlaps the above resource 902, i.e., the total received energy measurement value has already included the signal energy of device 1. However, for resources 901, 903~906, the total received energy measurement value does not include the signal energy of device 1. Therefore, the impact of device 1 needs to be incorporated into the total received energy measurement value of resources 901, 903~906, so as to obtain the effective total received energy of resources 901, 903~906. The effective total received energy and the total received energy of resource 902 are used for determining the total received energy reference value of resource 907. Assume that the total received energy measurement value of the corresponding subframe/subband is E, the received power reference value of the third type device B on the subframe/subband after subframe n is $P_B$. Thus, the energy E may be corrected to obtain the effective received energy $E'=E+P_B$ on the subframe/subband after subframe n. Alternatively, it is also possible to calculate the total received energy reference value of resources 901~906, and then deal with the impact of device 1 to obtain total received energy reference value used for determining whether resource 907 is usable. Alternatively, in FIG. 9, it is also possible to eliminate the received power of device 1 from the total received energy of resource 902, and then a total received energy reference value is calculated for a combination of resource 902 and the resources 901, 903~906. Then, the impact of device 1 is introduced to obtain the total received energy reference value used for determining whether resource 907 is usable.

If the received power reference value of resource occupied by the third type device B is relatively small, if merely the impact of the third type device B is considered, it will not make the corresponding resource unusable for device A. However, since the transmission of the third type device B is periodical, the resource occupation of the third type device B may lead to increase of the total received energy on one subframe/subband after subframe n. When it exceeds a threshold, the subframe/subband is unusable for device A.

As to the method of processing the resource occupation of other devices after subframe n according to the total received energy on each subframe/subband in the sensing window, device A may determine the total received energy reference value of one subframe/subband after subframe n according to one or more periodicities based on some known or configured resource occupation periodicity information.

As to a subband y of subframe x after subframe n, if multiple transmission periods of an interfering device need to be considered, a total received energy reference value may be respectively determined for each interfered period needs to be considered, so as to determine whether subband y of subframe x is usable for device A according to the multiple total received energy reference values. For example, a maximum value of the multiple total received energy reference values may be taken as the total received energy reference value of the subframe/subband, so as to determine whether the subframe/subband is usable for device A. Subsequently, the total received energy reference value of the subframe/subband may be compared with a threshold Th6. If it exceeds the threshold Th6, device A cannot occupy the subframe/subband.

As to a subband y in subframe x after subframe n, assume that one transmission period P of an interfering device needs to be considered. When determining the total received energy reference value, the impact of subband y in subframes x−m·P in the sensing window needs to be considered, wherein m is an integer which makes x−m·P located in the sensing window. The set of subframes need to be considered is denoted by M. The total received energy reference value may merely consider the last subframe in set M, i.e. the impact of the total received energy of subband y in the subframe closest to the end of the sensing window in the set M. For example, the total received energy reference value equals to the effective total received energy E' of subband y in the last subframe of the set M. Or, the total received energy reference value equals to E'+Δ, wherein. Δ is an offset. Or, the total received energy reference value may consider the impact of some or all subframes in the set M, e.g., the total received energy reference value may be an average value, a weighted average value or a moving average value of the effective total received energy of the subframes.

In the above method, the threshold Th6 may be a predefined value or a value configured by higher layer. Or, the threshold Th6 may depend on one or more parameters of device A. For example, Th6 may be relevant to the moving speed of device A, e.g., the higher the moving speed, the faster the received power varies, and a relatively small Th6 may be adopted to avoid potential collision as much as possible. Or, Th6 may be relevant to the service priority of device A, e.g., for a service with a high priority, in order to obtain more usable resources to ensure the transmission performance of the higher priority service of device A, a relatively large Th6 may be adopted. Or, in order to reduce collision, it is also possible to adopt a relatively small Th6. Or, Th6 may be relevant to the service type of device A, e.g. for a periodically transmitted service, since the interference may emerge repeatedly in multiple periods, a relatively small Th6 may be adopted to avoid collision as much as possible; whereas for an event-triggered service, since the interference is a one-time event or not last for a long time, a relatively large Th6 may be adopted. Or, Th6 may be relevant to the transmission power of device A, the higher the transmission power, the larger the interference to the other devices. A relatively small Th6 may be configured to reduce the collision.

Embodiment 4

As to the problem in embodiment 3, for the method of processing the resource occupation of other devices after subframe n based on the total received energy of each subframe/subband in the sensing window, a following method may be adopted.

For a subframe/subband in the sensing window, the signals of the data channels scheduled by all correctly received SAs may be removed, so as to measure the total received energy of merely the remaining signals on the subframe/subband. Or, it is also possible to remove the signals of the data channel scheduled by the correctly received SA only when the received power of the data channel scheduled by the SA exceeds a threshold, and then measure the total received energy of the remaining signals on the subframe/subband. For example, for a subframe/subband, assume the total received energy measurement value is E, the received power measurement value of the data channel scheduled by an SA is $P_S$, and the sum of received power measurement values of all data channels to be removed on the subframe/subband is $\Sigma P_S$, then after the signals of the data channels scheduled by the correctly received SA are removed, the total received energy of the remaining signals is $E_R = E - \Sigma P_S$.

For a subframe/subband after subframe n, device A may determine a corresponding subframe/subband in the sensing window according to some known or configured resource occupation periodicity information, i.e., according to the known or configured periodicity, assume a device occupies a channel on a corresponding subframe/subband in the sensing window, the device will also occupy a subframe/subband after subframe n. As such, it is possible to determine the total received energy reference value $E_{R,ref}$ of the remaining signals on the subframe/subband after subframe n according to the total received energy measurement value of the remaining signals on the corresponding subframe/subband.

For a subband y in subframe x after subframe n, if a transmission period P of the interfering device is considered, when determining the total received energy reference value of the remaining signals, the impact of subband y in subframes x−m·P in the sensing window needs to be considered, wherein m is an integer which makes x−m·P located in the sensing window. Assume that the set of subframes need to be considered is M. The total received energy reference value of the remaining signals may consider the impact of merely the last subframe in the set M, i.e., the subband y in the subframe closest to the end of the sensing window. For example, the total received energy reference value of the remaining signals equals to the total received energy $E_R$ of the remaining signals of subband y in the last subframe x−m·P of the set M, or the total received energy reference value of the remaining signals equals to $E_R + \Delta$, wherein $\Delta$ is an offset. Or, the total received energy reference value of the remaining signals equals to an average value, a weighted average value or a moving average value of the total receiving energies $E_R$ of the remaining signals of the subframes.

For a subband in a subframe after subframe n, if multiple transmission periods of the interfering device are considered, a total received energy reference value of the remaining signals may be respectively determined for each interfered period needs to be considered, and then the total received energy reference value $E_{R,ref}$ of the remaining signals of the subframe/subband is obtained. For example, the maximum value of the total received energy reference values of the remaining signals may be taken as the total received energy reference value $E_{R,ref}$ of the remaining signals on the subframe/subband.

Alternatively, for a subframe/subband after subframe n, the total received energy reference value $E_{R,ref}$ of the remaining signals of the subframe/subband may be obtained according to the total received energy measurement value of the remaining signals of the same subband in all subframes in the sensing window. For example, $E_{R,ref}$ may be an average value, a weighted average value or a moving average value of the total receiving energies $E_R$ of the remaining signals of all subframes. According to this calculation method, although the prediction of the remaining signal strength after subframe n merely reflects an average effect of the measurement of the sensing window, since the periodicity information of the remaining signals and whether the resources are released are unknown, the average operation is able to reflect characteristic of the remaining signals to some extent.

In fact, in the sensing window, through receiving the SA, device A may sense the resource occupation from one or more devices and the resources are not released. Therefore, the impact of the one or more devices needs to be considered after subframe n. If the received power reference value of the one or more devices is relatively small, it may not make the corresponding resources unusable for device A. However, due to the resource occupation of the one or more devices, the total received energy on a subframe/subband after subframe n may be increased. When it exceeds a threshold, the subframe/subband becomes unusable for device A. Thus, for a subframe/subband after subframe n, based on the total received energy reference value of the remaining signals and considering the received power reference values of other devices need to occupy the subframe/subband obtained via receiving the SA, the total received energy reference value of the subframe/subband can be obtained.

In particular, for a subframe/subband after subframe n, assume that device A determines according to the received SA that a device transmitting the SA needs to occupy channel in the subframe/subband, and the received power reference value of the device transmitting the SA is PPPB. Thus, in this subframe/subband, the total received energy reference value of all possible signals is $E_{ref} = E_{R,ref} + \Sigma P_B$, wherein $\Sigma P_B$ denotes a sum of the received power reference values of devices need to occupy channel in the subframe/subband. Then, the total received energy reference value— may be compared with the threshold Th6. If $E_{ref}$ exceeds the threshold Th6, device A cannot use this subframe/subband.

Figure 10:
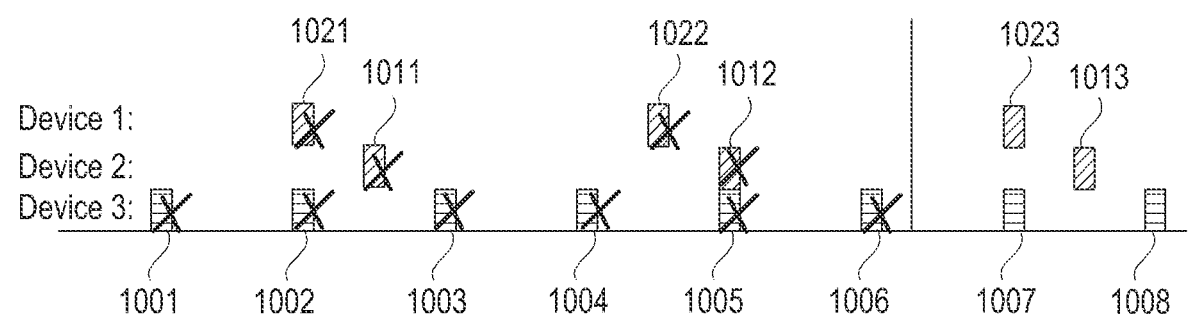
FIG. 10 is a schematic diagram illustrating measurement of received energy of remaining signals.

As shown in FIG. 10, on one hand, in the sensing window, all data signals (1001~1006, 1011~1012 and 1021~1022) of devices sensed via SA in the sensing window are removed and the total received energy of the remaining signals is measured, to obtain the total received energy reference value 1 of the remaining signals on the resource 1007/1023 after subframe n and the total received energy reference value 2 of the remaining signals on resource 1008 after subframe n. On the other hand, since the SAs of devices 1-3 are received, and devices 1 and 3 need to continue to occupy resources 1007/1023, and merely device 3 needs to continue to occupy resource 1008, the received power reference values of devices 1 and 3 are further added to the total received energy reference value 1 of the remaining signals, so as to obtain the total received energy reference value on resources 1007/1023 after subframe n. If the total received energy reference value of the remaining signals exceeds the threshold, resource 1007/1023 is unusable after subframe n. The received power reference value of device 3 may be further added to the total received energy reference value 2 of the remaining signals, so as to obtain the total received energy reference value of resource 1008 after subframe n. If the total received energy reference value exceeds the threshold, the resource 1008 is unusable after subframe n.

Figure 11:
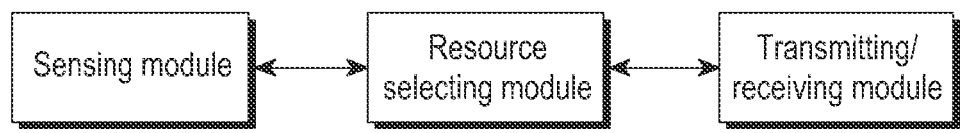
FIG. 11 is a schematic diagram illustrating a structure of a device according to some embodiments of the present disclosure.

In accordance with the above method, embodiments of the present disclosure also provide an apparatus. The apparatus may be used for implementing the above method. As shown in FIG. 11, the apparatus includes a sensing module, a resource selecting module and a transmitting/receiving module; wherein the sensing module is to sense an SA from another device, measure a received power of the SA and measure energy of each subband in a resource pool;

the resource selecting module is to select or re-select resources for an SA and a data channel of the apparatus according to the sensed SA of the other device, resources occupied by the other device indicated by the SA, the received power of the SA and the energy of each subband in the resource pool; and the transmitting/receiving module is to receive the SA and a data channel from the other device, and transmit the SA and the data channel of the apparatus according to the selected/re-selected resources.

Those with ordinary skill in the art may understand that some or all steps for implementing the above method may be implemented via program executed by relevant hardware. The program may be stored in a computer readable storage medium. When the program is executed, one or more steps of the above method are implemented.

In addition, the functional modules in various embodiments of the present disclosure may be integrated into one processing module, or may be independent physical modules. Or, two or more modules may be integrated into one module. The integrated modules may be implemented via hardware, or implemented as software functional modules. When being implemented as software functional modules and sold or used as an independent product, the integrated modules may be stored in a computer readable storage medium.

The above-mentioned storage medium may be read only memory, disk or compact disk, etc.

The foregoing are only preferred embodiments of the present invention and are not for use in limiting the protection scope of the present invention. Any modification, equivalent replacement and improvement made within the scope of the present invention should be covered under the protection scope of the present invention.

What is claimed is:
1. A method for transmitting data by a first device, the method comprising:
receiving, from a second device, sidelink scheduling information for the second device on a physical sidelink control channel (PSCCH);
determining a resource for sidelink transmission among a plurality of candidate resources for sidelink transmission based on the sidelink scheduling information; and
transmitting data on a physical sidelink shared channel (PSSCH) based on the determined resource,
wherein a first candidate resource including continuous subbands in a first time resource is excluded among the plurality of candidate resources for sidelink transmission, in case that the first device has not monitored a second time resource and the first time resource is determined based on the second time resource and a resource reservation period.

2. The method of claim 1, further comprising:
measuring a received power of a demodulation reference signal (DMRS) for the PSSCH based on the sidelink scheduling information,
wherein a second candidate resource is excluded among the plurality of candidate resources for sidelink transmission in case that a received power of a DMRS in the second candidate resource is higher than a threshold.

3. The method of claim 2,
wherein the threshold is determined based on a first priority for the first device and a second priority for the second device.

4. The method of claim 1,
wherein the first time resource and the second time resource satisfy the following equation:

$$y+j \times P_a = m + P_q, \text{ and}$$

wherein y is the first time resource, j is an integer larger than or equal to 0, $P_a$ is a first resource reservation period, m is the second time resource, and $P_q$ is a second resource reservation period.

5. A first device for data transmission, the first device comprising:
a transceiver; and
a controller coupled with the transceiver and configured to control to:
receive, from a second device, sidelink scheduling information for the second device on a physical sidelink control channel (PSCCH),
determine a resource for sidelink transmission among a plurality of candidate resources for sidelink transmission based on the sidelink scheduling information, and
transmit data on a physical sidelink shared channel (PSSCH) based on the determined resource,
wherein a first candidate resource including continuous subbands in a first time resource is excluded among the plurality of candidate resources for sidelink transmission, in case that the first device has not monitored a second time resource, and the first time resource is determined based on the second time resource and a resource reservation period.

6. The first device of claim 5, wherein the controller is configured to:
measure a received power of a demodulation reference signal (DMRS) for the PSSCH based on the sidelink scheduling information,
wherein a second candidate resource is excluded among the plurality of candidate resources for sidelink transmission in case that a received power of a DMRS in the second candidate resource is higher than a threshold.

7. The first device of claim 6,
wherein the threshold is determined based on a first priority for the first device and a second priority for the second device.

8. The first device of claim 6,
wherein the first time resource and the second time resource satisfy the following equation:

$y + j \times P_a = m + P_q$, and wherein y is the first time resource, j is an integer larger than or equal to 0, $P_a$ is a first resource reservation period, m is the second time resource, and $P_q$ is a second resource reservation period.

\* \* \* \* \*